United States Patent
Abo et al.

(10) Patent No.: US 6,253,137 B1
(45) Date of Patent: Jun. 26, 2001

(54) OIL PRESSURE SUPPLY DEVICE FOR VEHICLE DRIVE SYSTEM

(75) Inventors: Keiju Abo, Yokohama; Hideaki Takahara, Zama; Shojiro Kuroda, Sagamihara, all of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/220,341

(22) Filed: Dec. 24, 1998

(30) Foreign Application Priority Data

Dec. 25, 1997 (JP) .................................................. 9-358610

(51) Int. Cl.$^7$ .............................. G06F 7/00; G06F 17/00; G06F 19/00
(52) U.S. Cl. ............................ 701/51; 701/53; 477/157; 477/156; 180/367
(58) Field of Search ........................ 701/51, 53; 477/50, 477/52, 156, 157, 165, 38; 180/367

(56) References Cited

U.S. PATENT DOCUMENTS

| | | | |
|---|---|---|---|
| 3,938,409 | 2/1976 | Uozumi | 74/866 |
| 5,168,975 | 12/1992 | Bernhardt et al. | 192/0.096 |
| 5,474,428 | 12/1995 | Kimura et al. | 417/16 |
| 5,505,113 | * 4/1996 | Wiest | 74/733.1 |
| 5,980,427 | * 11/1999 | Lee | 477/158 |
| 5,997,437 | * 12/1999 | Jang | 477/156 |
| 6,049,750 | * 4/2000 | Adachi et al. | 701/51 |
| 6,058,345 | * 5/2000 | Kobayashi | 701/51 |
| 6,067,493 | * 5/2000 | Adachi et al. | 701/51 |
| 6,073,071 | * 6/2000 | Yasue et al. | 701/51 |

FOREIGN PATENT DOCUMENTS

| | | |
|---|---|---|
| 0 764 799 | 3/1997 | (EP) . |
| 0 788 914 | 8/1997 | (EP) . |
| 57-97942 | 6/1982 | (JP) . |
| 3-134368 | 6/1991 | (JP) . |

OTHER PUBLICATIONS

Patent Abstracts of Japan, abstract of A. Suzuki et al. "Oil Pressure Control Device for Transmission", 7–174218, Nov. 7, 1995.

* cited by examiner

Primary Examiner—William A. Cuchlinski, Jr.
Assistant Examiner—Olga Hernandez
(74) Attorney, Agent, or Firm—Foley & Lardner

(57) ABSTRACT

An engine and a motor are connected to the drive wheels of a vehicle via an automatic transmission. The drive wheels are driven using one of or both of the motor and the engine depending on the running state. The automatic transmission varies the drive ratio by the discharge pressure of the oil pressure pump. The oil pressure pump is driven by a second motor. When the automatic transmission is varying the drive ratio, the discharge of the oil pressure pump is increased by increasing the rotational speed of the second motor and thus the required oil for varying the drive ratio is maintained.

9 Claims, 13 Drawing Sheets

US 6,253,137 B1

OIL PRESSURE SUPPLY DEVICE FOR VEHICLE DRIVE SYSTEM

The contents of Tokugan Hei 9-3548610, with a filing date of Dec. 25, 1997 in Japan, are hereby incorporated by reference.

FIELD OF THE INVENTION

This invention relates to an oil pump for a vehicle drive system wherein an engine and a motor/generator are connected to drive wheels via a continuously variable transmission.

BACKGROUND OF THE INVENTION

European Patent Application EP0788914-A3 published by European Patent Office in 1998 discloses a vehicle drive system which inputs an output torque of one or both of an engine and a motor/generator through a continuously variable transmission. This is the so-called parallel hybrid vehicle drive system.

The generator/motor in this system is driven as a motor when electrical force is supplied from the battery and outputs rotational torque to the drive wheels. On the other hand, when rotational torque is input from the drive wheels, it functions as a generator and charges the battery by performing so-called regenerative braking. The drive ratio of the continuously variable transmission, i.e., the ratio of the input and output rotation speeds of the transmission, varies depending on the vehicle speed and the throttle opening of the engine.

SUMMARY OF THE INVENTION

The continuously variable transmission in this system is a V-belt continuously variable transmission which varies the drive ratio depending on oil pressure. Oil pressure is supplied from an oil pump connected to the input shaft of the continuously variable transmission. Even when the input shaft rotates at a low speed, the oil pump must provide the required discharge for the operation of the continuously variable transmission. However, determining the capacity of the oil pump on the basis of this kind of standard leads to excessive pump discharges when the input shaft is rotating at a high speed and the energy used to drive the pump is wasted.

It is therefore an object of this invention to improve the efficiency of the energy used to drive the oil pump.

In order to achieve the above object, this invention provides an oil pressure supply device for a vehicle drive system. In this drive system, an engine and a first motor are connected to a drive shaft via an automatic transmission and the transmission varies drive ratio depending on an oil pressure.

The device comprises an oil pump, a second motor connected to the oil pump, and an electrical circuit for regulating a rotation speed of the second motor. The oil pump varies a discharge according to the rotation speed of the second motor. The device further comprises a sensor for detecting an operating state of the automatic transmission and a microprocessor.

The microprocessor is programmed to determine from the operating state whether or not the automatic transmission is varying the drive ratio, and to control the electrical circuit so that the rotation speed of the second motor is higher when the automatic transmission is varying the drive ratio, than when the automatic transmission is not varying the drive ratio.

The details as well as other features and advantages of this invention are set forth in the remainder of the specification and are shown in the accompanying drawings.

DESCRIPTION OF THE PREFERRED EMBODIMENTS

Figure 1:
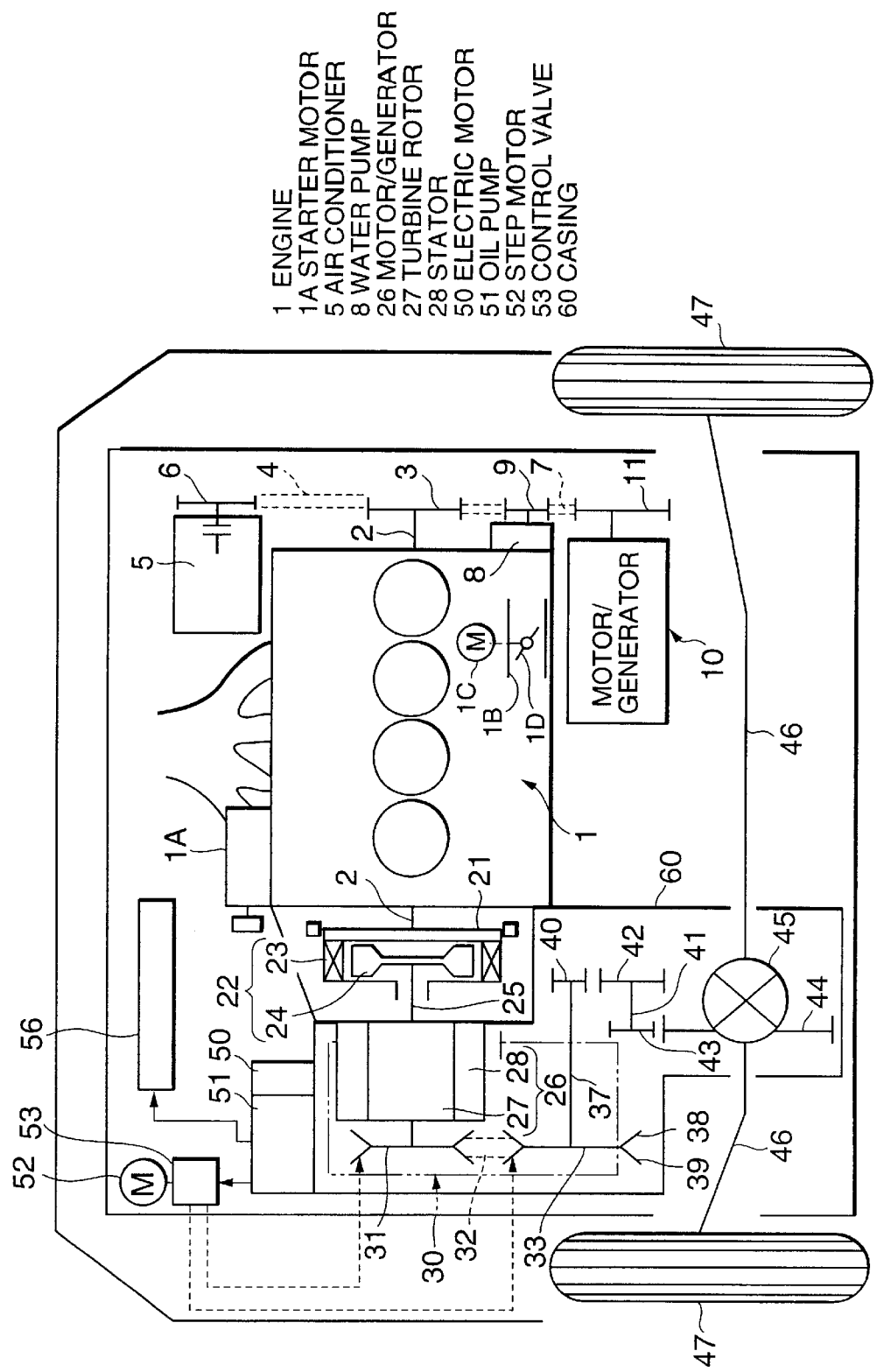
FIG. 1 is a schematic diagram of a vehicle drive system to which this invention is applied.

Referring to FIG. 1 of the drawings, a vehicle is provided with a parallel hybrid drive system comprising a gasoline engine 1 activated by a starter motor 1A and two motor/generators 10 and 26. The vehicle is also provided with a continuously variable transmission 30.

A crank pulley 3 is connected to an end of a crank shaft 2 of the engine 1. The crank pulley 3 drives the pulley 6 of the air conditioner 5 through a auxiliary belt 4. Furthermore the crank pulley 3 drives a pulley 9 of a water pump 8 and a pulley 11 of a three phase induction motor/generator 10 through another auxiliary belt 7.

The motor/generator 10 is operated as a motor by electrical force supplied from the battery not shown when the engine is not running and drives the air conditioner 5. The motor/generator 10 functions as a generator when the engine is running so as to charge a battery 71 shown in FIG. 2 as well as to supply power current to accessories.

Another end of the crank shaft 2 of the engine 1 is connected to a drive member 23 of an electrically activated powder clutch 22 through a flywheel 21, The drive member 23 is a ring shaped member which supports the exciting coils. A driven member 24 of the powder clutch 22 is connected to a drive shaft 25.

The drive shaft 25 is connected to a rotor 27 of the three phase induction motor/generator 26. The three phase induction motor/generator 26 is provided with a stator 28 having a plurality of magnetic poles fixed facing the rotor 27.

The rotations of the drive shaft 25 are input into the V-belt continuously variable transmission 30.

The continuously variable transmission 30 is provided with a primary pulley 31 and a secondary pulley 32 connected thereto via a V-belt 32.

Figure 3:
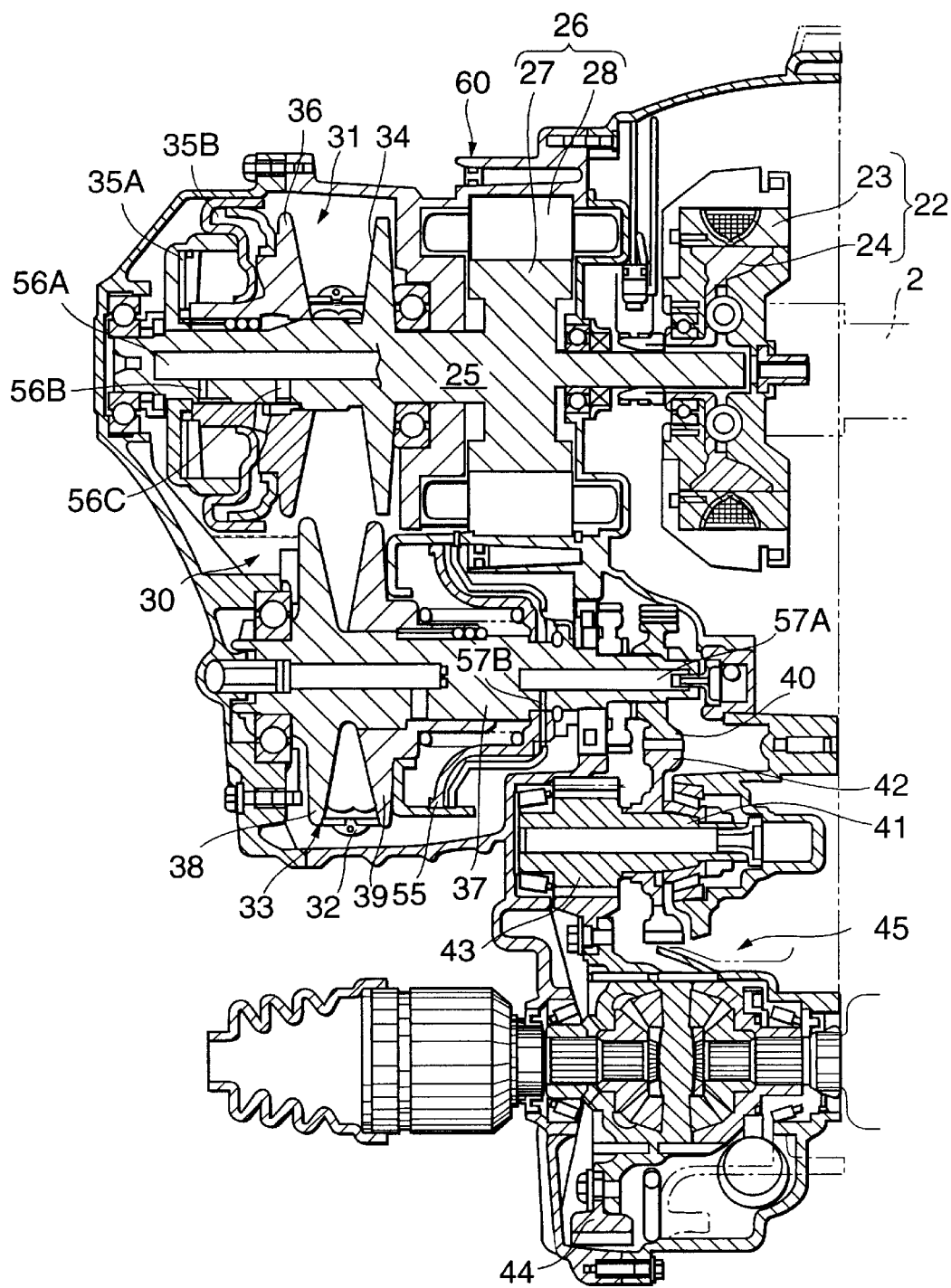
FIG. 3 is longitudinal sectional view of a continuously variable transmission and a motor/generator to which this invention is applied.

Referring to FIG. 3, the primary pulley 31 comprises a fixed wheel 34 fixed to the drive shaft 25 and a movable wheel 36 arranged to move in an axial direction. The V-shaped pulley groove for accommodating the V-belt 32 is formed between these wheels 34, 36.

The width of the pulley groove varies due to the axial displacement of the movable wheel 36 in response to the oil pressure supplied to oil chambers 35A and 35B. The oil pressure in the oil chambers 35A and 35B is supplied from a control valve 53 shown in FIG. 2 through an oil hole 56 formed on the inner section of the drive shaft 25 and the branching holes 56B and 56C which branch from the oil hole 56.

The secondary pulley 33 is provided with a fixed wheel 38 integrated in the same way with the rotation shaft 37 and a movable wheel 39. The V-belt 32 is fitted in the V-shaped pulley groove formed between the wheels 38, 39.

The width of the pulley groove between the wheels 38, 39 varies depending on the axial displacement of the movable pulley 39 in response to the oil pressure supplied to the oil chamber 55. The oil pressure in the oil chamber 55 is supplied from the control valve 53 through a oil hole 57A formed in the rotation shaft 37 and the branching hole 57B which branches off from the oil hole 57A.

The rotation shaft 37 is connected to a drive gear 40. The drive gear 40 meshes with an idler gear 42 which is supported free to rotate by an idler shaft 41. A pinion 43 which is fixed to the same idler shaft 41 meshes with a final gear 44.

Now, referring again to FIG. 1, the final gear 44 drives the drive wheels 47 through a differential gear unit 45 and drive shafts 46.

The motor/generator 26 and the continuously variable transmission 30 are arranged in the casing 60 with the group of gears from the drive gear 40 to the final gear 44.

An oil pump 51 which is driven by a motor 50 is provided on the outer side of the casing 60. The oil pressure generated by the oil pump 51 is supplied to the oil chambers 35A and 35B of the primary pulley 31 and the oil chamber 55 of the secondary pulley 33 through the control valve 53. The control valve 53 is operated by a step motor 52. The oil pump 51 also supplies lubricating oil to the components in the casing 60 and deposits oil to the oil cooler 56 for cooling.

Figure 2:
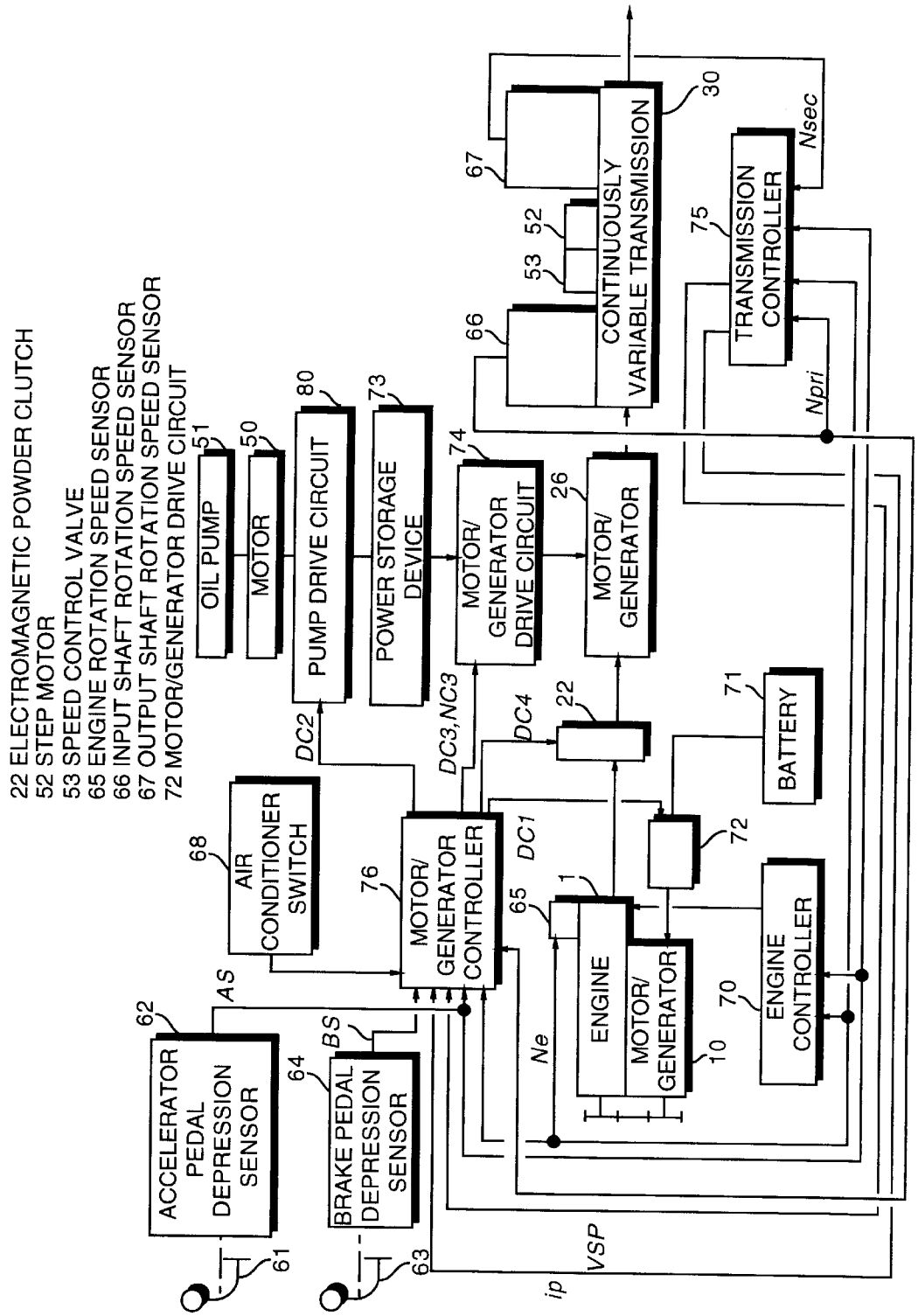
FIG. 2 is a block diagram showing the construction of a control device according to this invention.

Referring to FIG. 2 of the drawings, the parallel hybrid drive system is controlled by the motor/generator controller 76, engine controller 70 and transmission controller 75, each of which comprises a microcomputer provided with a central processing unit (CPU), a read only memory (RAM), a random access memory (ROM) and an input/output interface (I/O interface).

This vehicle is provided with an accelerator pedal 61 for transmitting an acceleration command from a driver to the engine 1. The accelerator pedal 61 is provided with an accelerator pedal depression sensor 62. The accelerator pedal depression sensor 62 detects a degree of depression of the accelerator pedal 61 and inputs a corresponding signal expressing the degree of accelerator pedal depression AS into the aforementioned three controllers 70, 75, 76.

The vehicle is also provided with a brake pedal 63 and a brake pedal depression sensor 64 which detects a degree of depression of the brake pedal 63. The degree of brake depression BS detected by the brake operation sensor 64 is input into the generator/motor controller 76.

An engine rotation speed sensor 65 is provided in the engine 1 which detects an engine rotation speed Ne and inputs corresponding signals into the aforementioned three controllers 70, 75, 76.

An output rotation speed sensor 67 which detects a rotation speed Nsec of the secondary pulley 33 and an input rotation speed sensor 66 which detects a rotation speed Npri of the primary pulley 31 are fitted in the continuously variable transmission 30. The input and output rotation speeds detected by these rotation speed sensors 66 and 67 are input into the transmission controller 75.

The engine 1, as shown in FIG. 1, is provided with an electric throttle 1D for regulating the air intake flowrate in an intake passage 1B. The electric throttle 1D is driven by a step motor 1C and the engine controller 70 controls the throttle opening of the electric throttle 1D by outputting a command signal to the step motor 1C. Hence the output torque of the engine 1 varies depending on the output signal of the engine controller 70.

The motor/generator 10, as shown in FIG. 2, is connected to the battery 71 through a motor/generator drive circuit 72. The motor/generator drive circuit 72 is provided with an inverter and a chopper. The motor/generator controller 76 operates the motor /generator either as a motor or as a generator through an output signal to the motor/generator drive circuit 72. The battery has a voltage of 12V. When the engine 1 is driven, the motor/generator 10 always functions as a generator. In order to control the motor/generator 10, a signal is input from an air conditioner switch 68 showing the operational state of the air conditioner 5 into the motor/generator controller 76.

The motor/generator 26 is connected to a power storage device 73 through a motor/generator drive circuit 74. The motor/generator drive circuit 74 is provided with a chopper and an inverter. The motor/generator controller 76 operates the motor/generator 26 either as a motor or as a generator through an output signal to the motor/generator drive circuit 74. The power storage device 73 is provided with a 345V chargeable battery and a condenser.

The motor 50 is connected to a battery 73 through a pump drive circuit 80 which has a chopper and an inverter. The motor/generator controller 76 varies the rotation speed of the motor 50 through an output signal to the pump drive circuit 80 and thus varies the discharge of the oil pump 51.

The motor/generator controller 76 also controls the release and engagement of the electrical powder clutch 22.

The transmission controller 75 controls the drive ratio of the continuously variable transmission 30 through an output signal to the step motor 52.

The transmission controller 75 calculates a vehicle speed VSP from an output rotation speed Nsec detected by the output rotation speed sensor 67. The transmission controller 75 then sets a target drive ratio im based on the input rotation speed Npri detected by the input rotation speed sensor 66 and the degree of depression of the accelerator pedal AS detected by the accelerator pedal depression sensor 62 and vehicle speed VSP.

The target drive ratio im increases as the vehicle speed VSP decreases, it increases as the degree of accelerator pedal depression AS increases and it increases as the engine rotation speed Ne increases.

Furthermore a real drive ratio ip is calculated based on the input rotation speed Npri and the output rotation speed Nsec. Feed-back control is performed on the step motor 52 so that the real drive ration ip corresponds with the target drive ratio im.

The control valve 53 which is driven by the step motor 52 varies an oil pressure which is transmitted to the oil chambers 35A, 35B, 55 of the continuously variable transmission 30 and varies the contact radius of the V-belt of the pulleys 31 and 33. In this way, the drive ratio of the continuously variable transmission 30 is varied.

It should be noted that in the explanation below, the drive ratio is defined as NpriNsec.

Signals showing the target drive ratio im and real drive ratio ip are input into the motor/generator controller 76 from the transmission controller 75. Furthermore signals indicative of the throttle a throttle opening TVO which is set by the engine controller 70, the engine rotation speed Ne, vehicle speed VSP, brake depression degree BS and accelerator pedal depression degree AS are input to the motor/generator controller 76.

Furthermore a signal which shows the operational state of the air conditioner 5 is input into the motor/generator controller 76. The motor/generator controller 76 controls the running of the vehicle based on these signals. Specifically, signals are output to the motor/generator drive circuits 72 and 74 and the electrical powder clutch 22. Also the command signals for the activation and termination of the engine 1 are output to the engine controller 70.

The motor/generator controller 76 determines into which of the following four running regions of the vehicle falls in order to control running of the vehicle.

A motor running region MA is a region in which the vehicle runs only on the output of the motor/generator 26.

An engine running region EA is a region in which the vehicle runs only on the output of the engine 1.

A hybrid running region HA is a region in which the vehicle performs normal running on the output of the engine 1 and uses the motor/generator 26 during acceleration.

An engine activation region ESA is a region which is located on the border of the motor running region MA and the EA and HA regions on its periphery.

Figure 6:
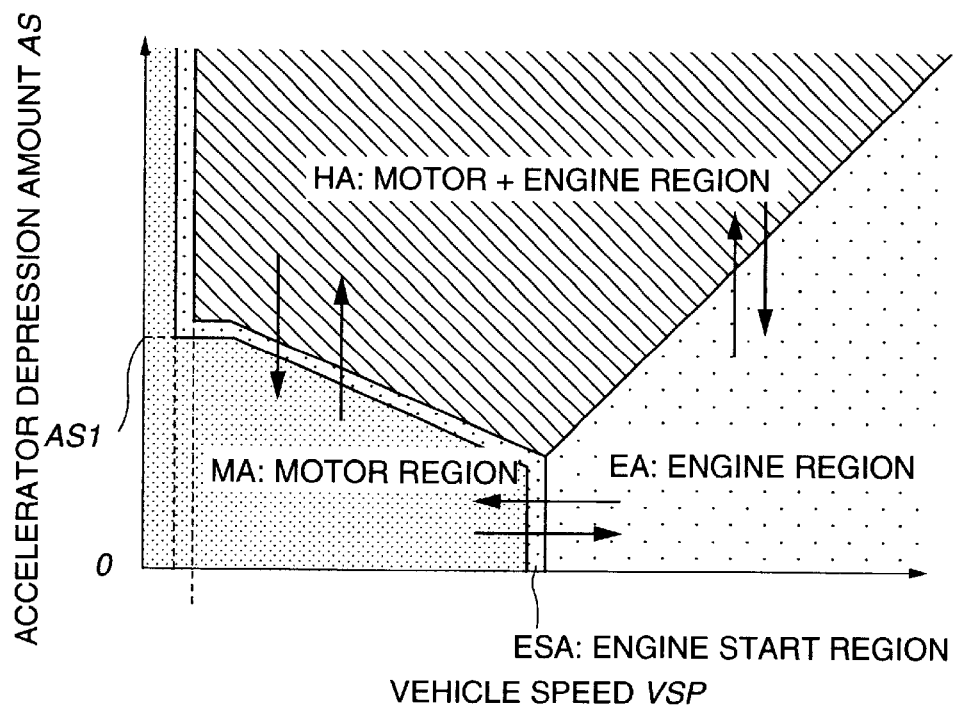
FIG. 6 is a diagram showing the contents of a map stored by the control device for defining a running pattern of a vehicle.

These regions are pre-set depending on the vehicle speed VSP and degree of accelerator pedal depression AS as shown in FIG. 6 and are stored in map form in the motor/generator controller 76. The motor /generator controller 76 also controls the electrical powder clutch 22, the motor/generator 26 and the engine 1 depending on the pre-determined running regions.

The motor/generator controller 76 also controls the oil pump drive circuit 80 and discharges from the oil pump 51 through the motor 50.

Figure 7:
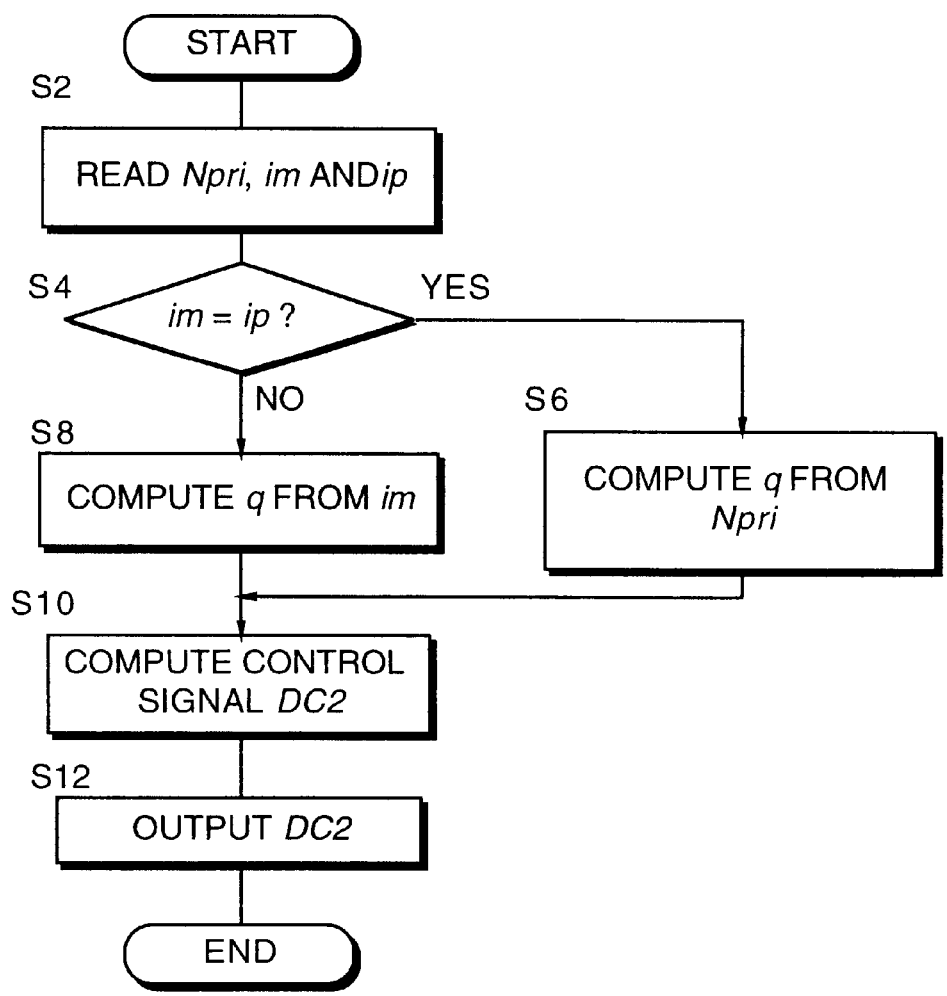
FIG. 7 is a flowchart describing a discharge control process of the oil pump performed by the control device.

The discharge control process of the oil pump 51 will now be described with reference to a flowchart in FIG. 7. The process is performed with a timer interrupt of, for example, 10 milliseconds.

Firstly in a step S2, the motor/generator controller 76 reads the rotation speed Npri of the primary pulley 31, the target drive ratio im and the real drive ratio ip.

In a step S4, it is decided whether or not the real drive ratio ip corresponds with the target drive ratio im.

When the real drive ratio ip corresponds with the target drive ratio im, the vehicle is running in a steady state. In this case, the routine proceeds to a step S6.

Figure 4:
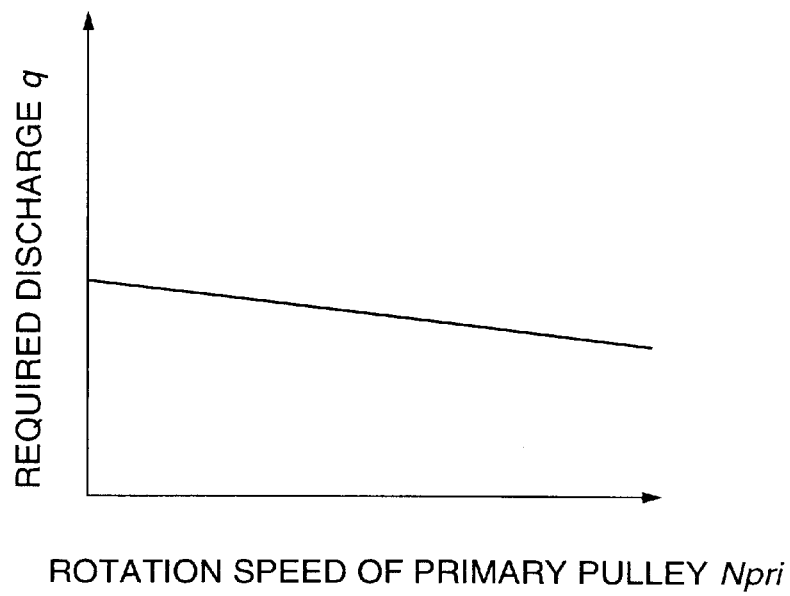
FIG. 4 is a diagram showing the contents of a map stored by the control device for defining a required discharge of an oil pump according to an input rotation speed of the continuously variable transmission.

In this step, a required discharge q of the oil pump 51 is calculated referring to the map shown in FIG. 4 based on the rotation speed Npri of the primary pulley 31. Based on the rotation speed Npri of the primary pulley, the map in FIG. 4 calculates the sum total of the minimum required discharge of oil to maintain the present drive ratio of the continuously variable transmission 30 in a steady state, the amount of oil supplied to the oil cooler 56 and the amount of lubricating oil supplied to the components in the casing 60. The map is pre-stored in the motor/generator controller 76. After the completion of the step S6, the routine proceeds to a step S10.

On the other hand, in the step 4,when the real drive ratio ip does not correspond with the target drive ratio im, it means that drive ratio is varying in the transmission.

Figure 5:
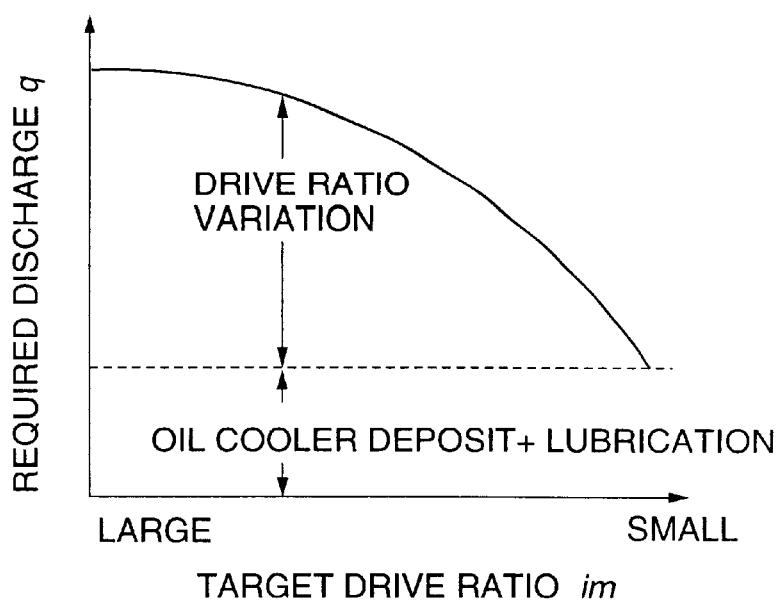
FIG. 5 is a diagram showing the contents of a map stored by the control device for defining the required discharge of the oil pump according to a target drive ratio of the transmission.

In this case, the routine proceeds to a step S8. In this step, by referring to the map in FIG. 5, a required discharge q of the oil pump 51 is calculated. Based on a target drive ratio im, the map in FIG. 5 calculates the sum total of the required discharge of oil for the variation in the drive ratio of the continuously variable transmission 30, the amount of oil supplied to the oil cooler 56 and the amount of lubricating oil supplied to the components in the casing 60. The map is pre-stored in the motor/generator controller 76. After the completion of this calculation, the routine proceeds to a step S10.

In the step S10, the control signal DC2 of the motor 50 in order to realize a required discharge q is calculated.

In a step 12, the control signal DC2 is output to the oil pressure pump drive circuit 80 and the routine is terminated.

Figure 8:
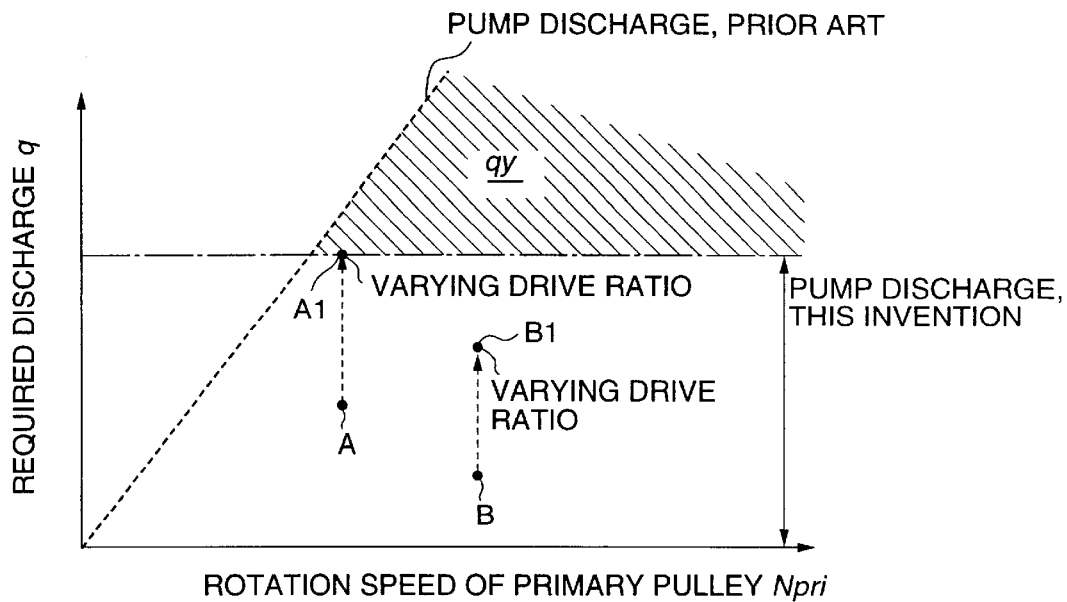
FIG. 8 is a diagram showing the discharge characteristics of the oil pump controlled by the control device.

As a result of the above process, as shown at points A and B in FIG. 8, when the vehicle is running at a steady state, the required discharge of the oil pump 51 is low irrespective of the primary pulley rotation speed Npri. When the continuously variable transmission 30 varies the drive ratio, the discharge of the pump 51 is increased as shown in the figure at points A1 and B1 by increasing the rotation speed of the motor 50. The dotted line in the figure corresponds to the maximum value for required discharge calculated from the map in FIG. 5.

The broken line in the figure shows the discharge of an example of a conventional oil pump directly connected to the input shaft of the continuously variable transmission. In the conventional oil pump, when the rotation speed Npri of the primary pulley 31 is low, the discharge is low. Thus it has been necessary to use a large capacity oil pump in order to fulfill the required discharge when the rotation speed Npri of the primary pulley 31 is low. As a result, when the rotation speed Npri is high, the real discharge greatly exceeds the required discharge which leads to the excess discharge shown in the region qy in the figure. This simply results in the drive force of the oil pump being used unnecessarily and in increase of the fuel consumption of the engine.

Since this invention uses the motor 50 to drive the oil pump 51, it is possible to set the discharge independently of the rotation speed Npri of the primary pulley 31. Thus excess discharge is shown in region qy of the figure is removed from the discharge of the pump 51 which results in decreased fuel consumption.

A second embodiment of this invention will be explained with reference to FIGS. 9–13.

In this embodiment of the invention, a coupled oil pressure pump 82 which rotates together with the drive shaft 25 is further provided between the motor/generator 26 and the V-belt continuously variable transmission 30. The coupled oil pressure pump 82 is not a large capacity pump as in the prior art. It is a small capacity pump which slowly increases the discharges depending on increases in the rotation speed Npri of the primary pump 31. The discharge of the coupled oil pressure pump 82 is set to value which is the sum of the lubrication oil amount supplied to the components in the casing 60, the minimum required discharge to maintain the drive ratio of the V-belt continuously variable transmission 30 and the oil amount supplied to the oil cooler 56.

Figure 13:
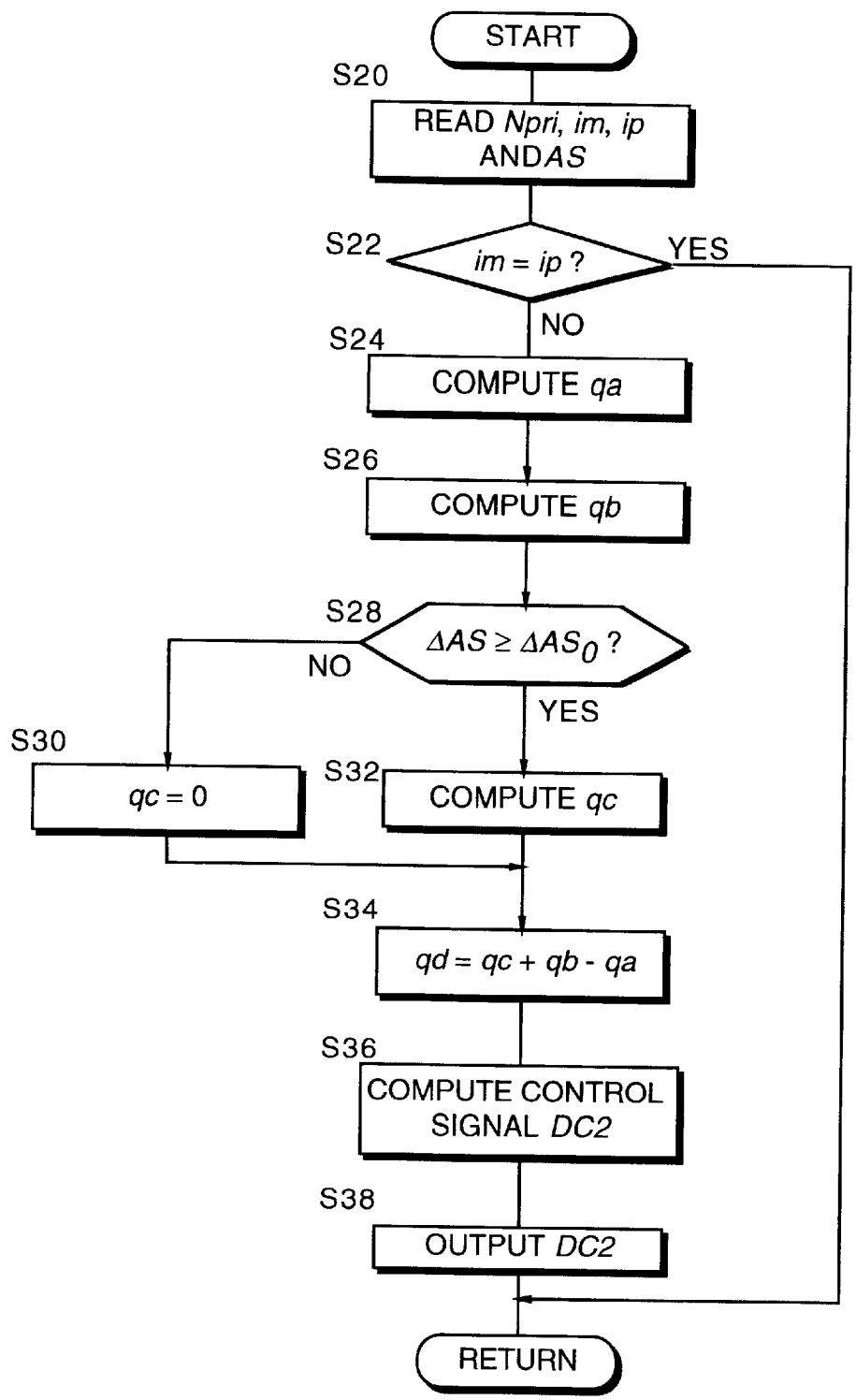
FIG. 13 is a flowchart describing a discharge control process of the oil pump performed by the control device according to the second embodiment.

On the other hand, the motor/generator controller 76 controls the discharge of the oil pump 51 according to the flowchart shown in FIG. 13.

Specifically, in a step S20, the rotation speed Npri of the primary pump 31, the target drive ratio im, the real drive ratio ip and the degree of accelerator pedal depression AS are read.

In a step S22, it is decided whether or not the real drive ratio ip corresponds to the target drive ratio im in the same manner as S4 in the first embodiment.

When the real drive ratio ip corresponds to the target drive ratio im, the vehicle is running in a steady state, and the routine is terminated without performing further processing.

When the real drive ratio ip does not correspond to the target drive ratio im, it means the drive ratio of the continuously variable transmission 30 is varying. In this case, the routine proceeds to a step S24 and the subsequent steps so as to increase the discharge of the oil pump 51.

Figure 10:
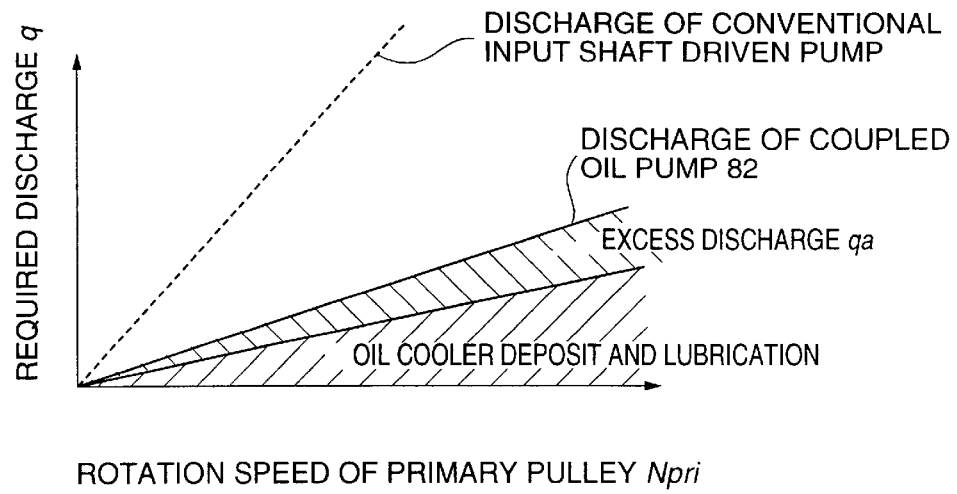
FIG. 10 is a diagram showing the contents of a map stored by the control device according to the second embodiment for the purpose of defining discharge of the oil pump with respect to the input rotation speed of the continuously variable transmission.
Figure 9:
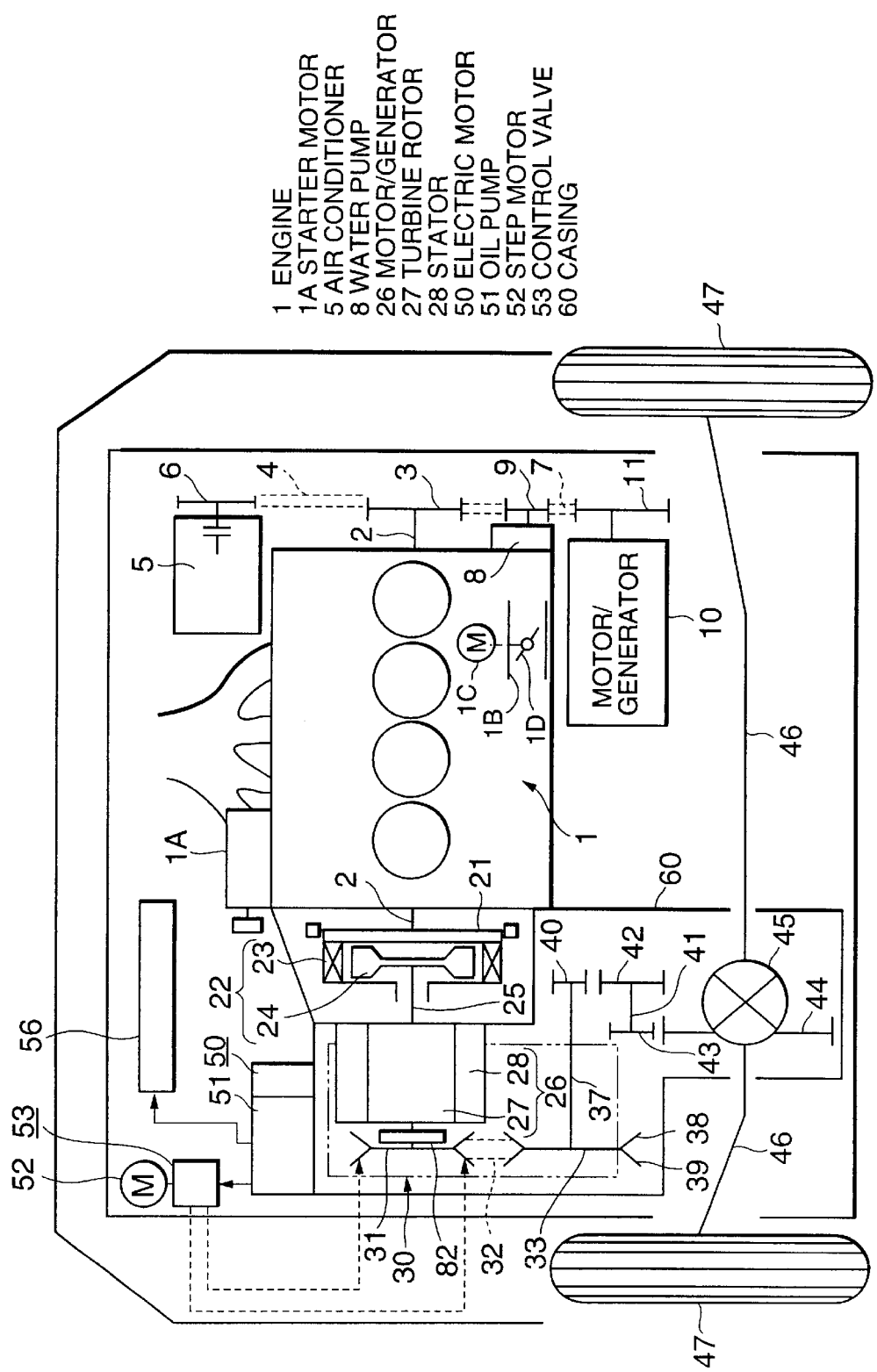
FIG. 9 is similar to FIG. 1, but showing a second embodiment of this invention.

In the step S24, the excess discharge qa of the coupled oil pressure pump 82 is determined with reference to the map shown in FIG. 10 which is prestored in the motor/generator controller 76. This corresponds to the value of subtracting the amount of oil supplied to the oil cooler 56 and the lubrication oil amount of the components in the casing 60 from the discharge of the coupled oil pump 82.

Figure 11:
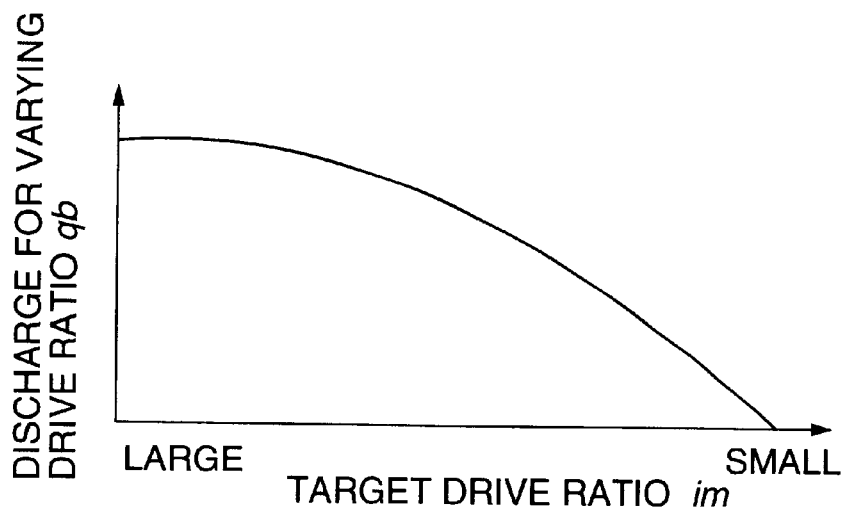
FIG. 11 is a diagram showing the contents of a map stored by the control device according to the second embodiment for the purpose of defining required discharge of the oil pump for the operation of the continuously variable transmission.

In a step S26, the required discharge qb for the drive ratio varying operation of the continuously variable transmission 30 is determined on the basis of the target drive ratio im with reference to the map shown in FIG. 11 which is prestored in the motor/generator controller 76. This corresponds to the map in FIG. 5 of the first embodiment of the invention.

Then in a step S28, an accelerator pedal depression speed $\Delta AS$ is calculated from the difference of the degree of accelerator pedal depression AS at present and that detected in the immediately preceding occasion when the routine was performed, $AS_{-1}$. The accelerator pedal operation speed $\Delta AS$ is compared with reference value $\Delta AS_0$. In the result that $\Delta AS < \Delta AS_0$, it is decided that urgent operation of the continuously variable transmission 30 is not required. In this case, the routine proceeds to a step S30, an increment qc is set to 0, and the routine proceeds to a step S34. In the result that $\Delta AS \geq \Delta AS_0$, it is decided that urgent operation of the continuously variable transmission 30 is required. In this case, the routine proceeds to a step S32.

Figure 12:
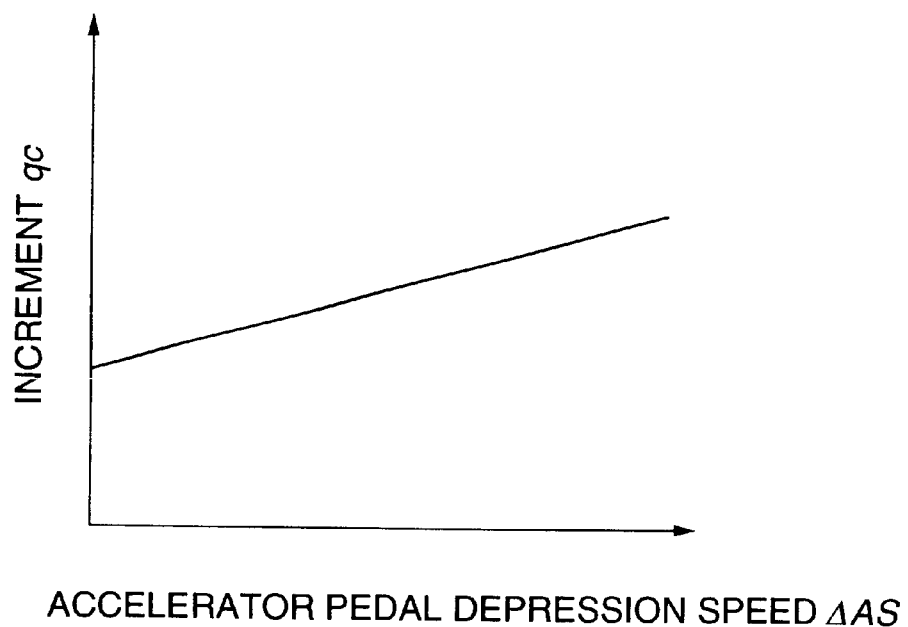
FIG. 12 is a diagram showing a map stored by the control device according to the second embodiment for the purpose of defining discharge increase with respect to an accelerator pedal depression.

In the step S32, the increment qc is calculated based on the accelerator pedal depression speed $\Delta AS$ by reference to the map shown in FIG. 12 which is prestored in the motor/generator controller 76, and the routine proceeds to a step S34.

In the step S34, a discharge of the oil pump qd is calculated by subtracting the excess discharge qa from the sum of the increment qc and the required discharge qb for the drive ratio varying operation.

In a step S35, the control signal DC2 of the motor 50 which corresponds to the discharge qd is calculated.

In a step S36, the control signal DC2 is outputed to the oil pump drive circuit 80 and the routine terminates.

According to this second embodiment of the invention, when the vehicle is running in a steady state, the minimum oil discharge required for maintaining the present drive ratio of the continuously variable transmission 30, the oil amount supplied to the oil cooler 56 and the lubricating oil amount which is supplied to the components in the casing 60 are provided from the coupled oil pump 82.

On the other hand, when the continuously variable transmission 30 varies the drive ratio, the oil pump 51 is driven, the deviation between the discharge of the coupled oil pump 82 and the sum total of the required oil discharge to vary the drive ratio of the continuously variable transmission 30, the oil amount supplied to the oil cooler 56 and the lubricating oil amount which is supplied to the components in the casing 60 is supplied from the oil pressure pump 51.

Thus more efficient control of pump discharge than in the first embodiment is possible.

Furthermore, according to this second embodiment, when the accelerator pedal is sharply depressed, variation of the drive ratio of the continuously variable transmission 30 is quickly performed in accordance with the increment qc, which is larger the faster the accelerator pedal depression.

The coupled oil pump 82 consumes very little engine torque and has no adverse effect on engine fuel consumption since it is a small capacity pump which slowly increases discharges depending on the input rotation number N.

A third embodiment of the invention will now be explained with reference to FIGS. 14–16.

Figure 14:
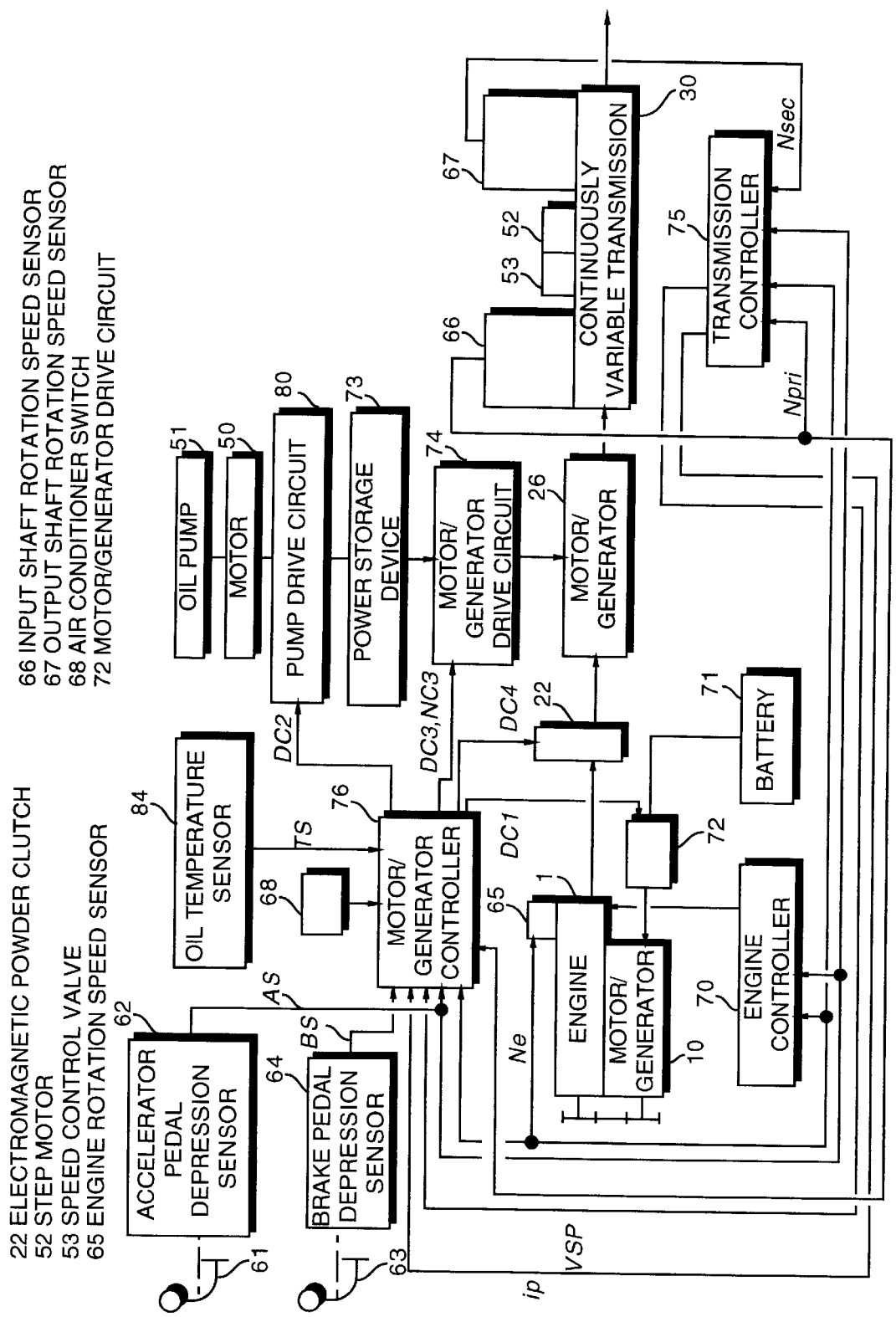
FIG. 14 is similar to FIG. 2, but showing a third embodiment of this invention.

As shown in FIG. 14, this embodiment adds an oil temperature sensor in addition to the components in the aforesaid second embodiment. The oil temperature sensor 84 is a sensor which detects the temperature of an oil reservoir, not shown in the figure, which temporarily stores oil to be used as lubricant or for varying or maintaining the drive ratio. The detected oil temperature TS is input to the motor/generator controller 76.

Figure 15:
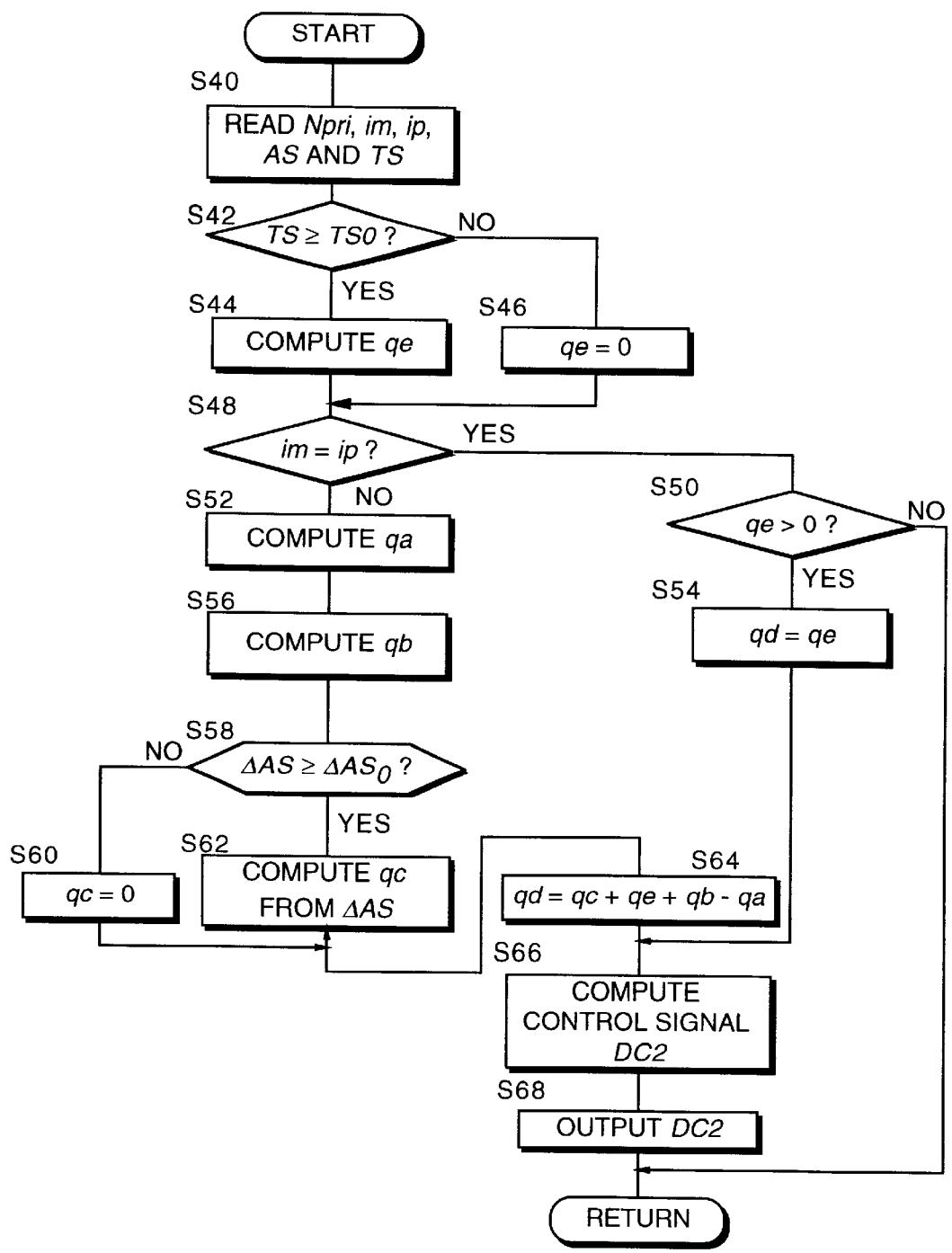
FIG. 15 is a flowchart describing a discharge control process of the oil pump performed by the control device according to the third embodiment.
Figure 16:
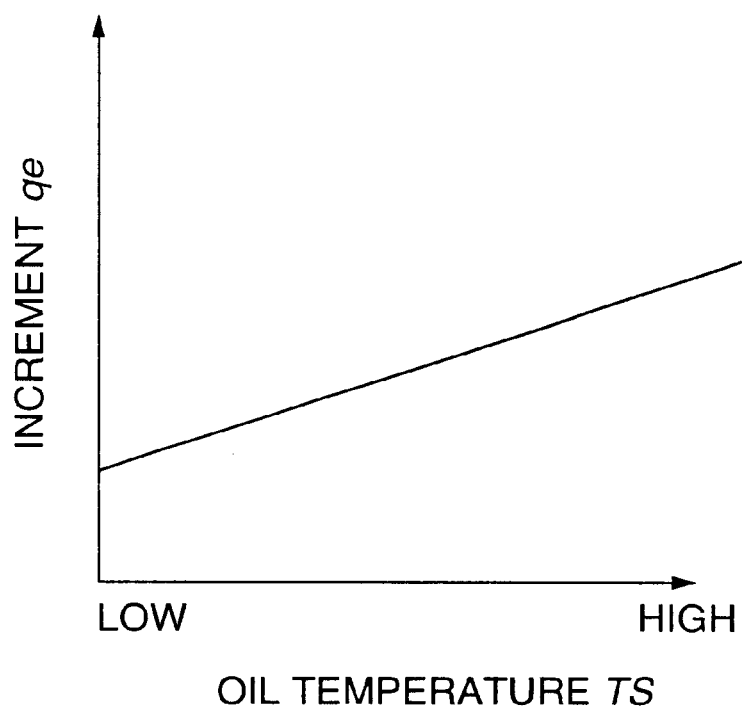
FIG. 16 is a diagram showing a map stored by the control device according to the third embodiment for the purpose of defining discharge increase with respect to oil temperature.

The motor/generator controller 76 controls the discharge of the oil pump 51 by performing the routine shown in the flowchart in FIG. 15.

Firstly in a step S40, the rotation speed Npri of the primary pulley 31, the target drive ratio im, the real drive ratio ip and the degree of accelerator pedal depression AS and the oil temperature TS are read.

Then in a step S42, a present oil temperature TS and a reference value $TS_0$ which determines the required degree of cooling are compared.

If $TS \geq TS_0$ the routine proceeds to a step S44, if $TS < TS_0$, the routine proceeds to a step S46.

In the step S44, oil increment qe is calculated based on the oil temperature TS with reference to the map shown in FIG.

16 which is prestored in the motor/generator controller 76, and the routine proceeds to a step S48.

In a step S46, oil increment qe is set to 0 and the routine proceeds to the step S48.

In the step S48, it is determined whether a target drive ratio im corresponds to the real drive ratio ip in the same way as in the step S22 in the aforesaid second embodiment.

When the target drive ratio im corresponds to the real drive ratio ip, it is determined that the vehicle is in a steady state running and the routine proceeds to a step S50. In this step, it is determined whether or not the oil increment qe takes a positive value. If the oil increment qe takes a positive value, in a step S54, the oil increment qe is set to the discharge qd of the oil pump 51 and the routine proceeds to a step S66. If the oil increment qe does not take a positive value, no further processing is performed and the routine is terminated.

On the other hand in a step S42, if the target drive ratio im does not corresponds to the real drive ratio ip, it is determined that the continuously variable transmission 30 is varying the drive ratio and the routine proceeds to a step S52. Steps S52 to S62 are the same as the steps S22 to S32 in the aforesaid second embodiment and will not be explained again here.

In a step S64, the discharge qd of the oil pump 51 is calculated by subtracting excess discharge qa from the sum total of the oil increments qc, qe and required discharge qb for the drive ratio varying operation.

In a step S66, a motor control signal DC2 corresponding to the discharge qd is calculated.

In a step S68, the control signal DC2 is output to the oil pressure pump drive circuit 80 and the routine is terminated.

According to this embodiment, when the oil temperature TS in the oil reservoir exceeds a reference value $TS_0$, oil increment qe is applied and the discharge of the oil pressure pump 51 is increased. In this way, the amount of oil supplied to the oil cooler 56 is increased. Thus it is possible to cool high temperature oil in addition to the effect of the aforesaid second embodiment.

This type of oil increment qe based on oil temperature TS can also be applied to the device corresponding to the aforesaid first embodiment.

All of the above embodiments are used with a V-belt continuously variable transmission. However, if a transmission performs variable action using oil pressure, it is capable of application irrespective of the type of transmission.

All of embodiments above used a generator/motor 26. However, this invention can also be applied to a vehicle drive system provided with a separate generator and motor. Furthermore this invention can also be applied to a vehicle drive system combined with a normal motor and engine instead of a generator/motor 26.

The generator/motor 26 may be connected to an output shaft of the continuously variable transmission 30 instead of being connected to the input shaft of the continuously variable transmission 30. Furthermore the generator/motor 26 need not be directly connected to the input or output shaft, but can be connected thereto through a rotation transmission member such as a belt or a set of gears.

In addition it is possible to arrange all of the engine controller 70, the variable transmission controller 75, the motor/generator controller 76 and the ABS controller 80 or a plurality thereof onto a single microcomputer.

Furthermore in all of the embodiments above, whether or not the continuously variable transmission 30 was varying the driver ratio was determined by whether or not the target drive ratio im was equal to the real drive ratio ip. However it is possible to perform this decision based on the variation of the real drive ratio ip.

The embodiments of this invention in which an exclusive property or privilege is claimed are defined as follows. The corresponding structures, materials, acts, and equivalents of all means plus function elements in the claims below are intended to include any structure, material, or acts for performing the functions in combination with other claimed elements as specifically claimed.

What is claimed is:

1. An oil pressure supply device for a vehicle drive system wherein an engine and a first motor are connected to a drive shaft via an automatic transmission, said transmission comprising an input shaft and varying a drive ratio depending on an oil pressure, said oil pressure supply device comprising:

an oil pump, a second motor connected to said oil pump, an electrical circuit for regulating a rotation speed of said second motor, said oil pump varying a discharge according to the rotation speed of said second motor, a first sensor for detecting an operating state of said automatic transmission, a second sensor which detects a rotation speed of said input shaft, and a microprocessor programmed to:

determine from said operating state whether or not said automatic transmission is varying the drive ratio, and control said electrical circuit so that the rotation speed of said second motor is higher when said automatic transmission is varying the drive ratio, than when said automatic transmission is not varying the drive ratio, and that the rotation speed of said second motor increases as the rotation speed of said input shaft decreases, when said automatic transmission is not varying the drive ratio.

2. An oil pressure supply device for a vehicle drive system wherein an engine and a first motor are connected to a drive shaft via an automatic transmission, said transmission comprising an input shaft and varying a drive ratio depending on an oil pressure, said oil pressure supply device comprising:

an oil pump, a second motor connected to said oil pump, an electrical circuit for regulating a rotation speed of said second motor, said oil pump varying a discharge according to the rotation speed of said second motor, means for detecting an operating state of said automatic transmission, means for detecting a rotation speed of said input shaft, and means for determining from said operating state whether or not said automatic transmission is varying the drive ratio, and means for controlling said electrical circuit so that the rotation speed of said second motor is higher when said automatic transmission is varying the drive ratio, than when said automatic transmission is not varying the drive ratio, and that the rotation speed of said second motor increases as the rotation speed of said input shaft decreases, when said automatic transmission is not varying the drive ratio.

3. An oil pressure supply device for a vehicle drive system wherein an engine and a first motor are connected to a drive shaft via an automatic transmission, said transmission varying a drive ratio depending on an oil pressure controlled by a drive ratio control device to a target drive ratio corresponding to a running state of said vehicle, said oil pressure supply device comprising:

an oil pump, a second motor connected to said oil pump, an electrical circuit for regulating a rotation speed of said second motor, said oil pump varying a discharge according to the rotation speed of said second motor, a sensor for detecting an operating state of said automatic transmission, and a microprocessor programmed to:

determine from said operating state whether or not said automatic transmission is varying the drive ratio, control said electrical circuit so that the rotation speed of said second motor is higher when said automatic transmission is varying the drive ratio, than when said automatic transmission is not varying the drive ratio, and that the rotational speed of said second motor becomes higher the larger said target drive ratio.

4. An oil pressure supply device for a vehicle drive system wherein an engine and a first motor are connected to a drive shaft via an automatic transmission, said transmission comprising an input shaft and an output shaft, and varying a drive ratio depending on an oil pressure controlled by a drive ratio control device to a target drive ratio corresponding to a running state of said vehicle, said oil pressure supply device comprising:

an oil pump, a second motor connected to said oil pump, an electrical circuit for regulating a rotation speed of said second motor, said oil pump varying a discharge according to the rotation speed of said second motor, a first sensor for detecting a rotation speed of said input shaft, a second sensor for detecting a rotation speed of said output shaft, and a microprocessor programmed to:

calculate a real drive ratio of said automatic transmission from the ratio of the rotation rotational speed of said input shaft and the rotation speed of said output shaft, determine whether or not said automatic transmission is varying the drive ratio by comparing said real drive ratio and said target drive ratio, and control said electrical circuit so that the rotation speed of said second motor is higher when said automatic transmission is varying the drive ratio, than when said automatic transmission is not varying the drive ratio.

5. An oil pressure supply device for a vehicle drive system wherein an engine and a first motor are connected to a drive shaft via an automatic transmission, said transmission comprising an input shaft and an output shaft, and varying a drive ratio depending on an oil pressure, said oil pressure supply device comprising:

an oil pump, a second motor connected to said oil pump, an electrical circuit for regulating a rotation speed of said second motor, said oil pump varying a discharge according to the rotation speed of said second motor, a second oil pressure pump which is driven by said input shaft, a sensor for detecting an operating state of said automatic transmission, a microprocessor programmed to:

determine from said operating state whether or not said automatic transmission is varying the drive ratio, and control said electrical circuit so as to stop the operation of said second motor when said automatic transmission is not varying the drive ratio.

6. An oil pressure supply device for a vehicle drive system wherein an engine and a first motor are connected to a drive shaft via an automatic transmission, said vehicle comprising an accelerator pedal, said transmission comprising an input shaft and varying a drive ratio depending on an oil pressure, said oil pressure supply device comprising:

a first oil pump, a second motor connected to said first oil pump, an electrical circuit for regulating a rotation speed of said second motor, said first oil pump varying a discharge according to the rotation speed of said second motor, a second oil pump which is driven by said input shaft, a first sensor for detecting an operating state of said automatic transmission, a second sensor for detecting a depression degree of said accelerator pedal, and a microprocessor programmed to:

determine from said operating state whether or not said automatic transmission is varying the drive ratio, calculate a depression speed of said accelerator pedal from the depression degree of said accelerator pedal, control said electrical circuit so that the rotation speed of said second motor is higher when said automatic transmission is varying the drive ratio, than when said automatic transmission is not varying the drive ratio, and that rotation speed of said second motor is increased when said depression speed is larger than a predetermined speed.

7. An oil pressure supply device as defined in claim 6, wherein said microprocessor is further programmed to control said electrical circuit so that the rotation speed of said second motor varies in accordance with said depression speed.

8. An oil pressure supply device for a vehicle drive system wherein an engine and a first motor are connected to a drive shaft via an automatic transmission, said transmission comprising an input shaft and varying a drive ratio depending on an oil pressure, said oil pressure supply device comprising:

an oil pump, a second motor connected to said oil pump, an electrical circuit for regulating a rotation speed of said second motor, said oil pump varying a discharge according to the rotation speed of said second motor, a sensor for detecting an operating state of said automatic transmission, a sensor for detecting a temperature of an oil, and a microprocessor programmed to:

determine from said operating state whether or not said automatic transmission is varying the drive ratio, and control said electrical circuit so that the rotation speed of said second motor is higher when said automatic transmission is varying the drive ratio, than when said automatic transmission is not varying the drive ratio, and that the rotation speed of said second motor is increased when said temperature is higher than a predetermined temperature.

9. An oil pressure supply device as defined in claim 8 wherein said microprocessor is further programmed to control said electrical circuit so that the rotational speed of said second motor becomes higher the higher said temperature, when said temperature is higher than the predetermined temperature.

* * * * *